United States Patent
Goto et al.

(10) Patent No.: US 12,084,023 B2
(45) Date of Patent: Sep. 10, 2024

(54) BRAKING CONTROL METHOD AND BRAKING CONTROL DEVICE

(71) Applicant: Nissan Motor Co., Ltd., Yokohama (JP)

(72) Inventors: Akinobu Goto, Kanagawa (JP); Yuki Shiozawa, Kanagawa (JP); Naotaka Usui, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/286,071

(22) PCT Filed: Apr. 12, 2021

(86) PCT No.: PCT/JP2021/015191
§ 371 (c)(1),
(2) Date: Oct. 6, 2023

(87) PCT Pub. No.: WO2022/219681
PCT Pub. Date: Oct. 20, 2022

(65) Prior Publication Data
US 2024/0182005 A1    Jun. 6, 2024

(51) Int. Cl.
*B60T 7/22* (2006.01)
*B60W 60/00* (2020.01)

(52) U.S. Cl.
CPC .............. *B60T 7/22* (2013.01); *B60W 60/001* (2020.02); *B60T 2201/022* (2013.01); *B60T 2210/32* (2013.01)

(58) Field of Classification Search
CPC .. B60T 7/22; B60T 2201/022; B60T 2210/32; B60W 60/001

USPC .......................................................... 701/70
See application file for complete search history.

(56) References Cited

U.S. PATENT DOCUMENTS

| | | | | |
|---|---|---|---|---|
| 8,903,617 | B2 * | 12/2014 | Braunberger | B60W 30/143 |
| | | | | 701/70 |
| 8,954,251 | B2 * | 2/2015 | Braunberger | B60W 30/143 |
| | | | | 701/70 |
| 2008/0021625 | A1 * | 1/2008 | Ohtomo | B60T 7/22 |
| | | | | 701/70 |
| 2014/0142797 | A1 | 5/2014 | Otake | |
| 2017/0158175 | A1 * | 6/2017 | Fairfield | G05D 1/0088 |
| 2018/0326956 | A1 * | 11/2018 | Zhu | B60T 17/22 |
| 2019/0232958 | A1 * | 8/2019 | Deng | B60T 7/22 |
| 2019/0347492 | A1 | 11/2019 | Morimura et al. | |
| 2020/0005645 | A1 * | 1/2020 | Wray | G08G 1/166 |

(Continued)

FOREIGN PATENT DOCUMENTS

| CN | 115769287 A | * | 3/2023 | ............ B60W 30/18 |
|---|---|---|---|---|
| CN | 116331253 A | * | 6/2023 | |

(Continued)

*Primary Examiner* — Atul Trivedi
(74) *Attorney, Agent, or Firm* — Young Basile Hanlon & MacFarlane, P.C.

(57) ABSTRACT

A processor of a braking control device determines whether or not a moving object is detected in a predetermined region downstream an expected stop position, and when determining that a moving object is detected in the predetermined region, changes a deceleration decrease position, which is a start position of a deceleration decrease section, upstream relative to that when determining that no moving object is detected in the predetermined region.

14 Claims, 8 Drawing Sheets

(56) References Cited

U.S. PATENT DOCUMENTS

| | | | |
|---|---|---|---|
| 2020/0117206 A1* | 4/2020 | Egnor | B60W 30/0953 |
| 2021/0009115 A1 | 1/2021 | Ohmura et al. | |
| 2021/0094577 A1* | 4/2021 | Shalev-Shwartz | B60W 30/181 |
| 2021/0294323 A1* | 9/2021 | Bentahar | B60W 50/00 |
| 2021/0316750 A1* | 10/2021 | Jo | B60W 30/18154 |
| 2022/0063651 A1* | 3/2022 | Dai | B60W 60/001 |
| 2022/0073096 A1* | 3/2022 | Akella | B60W 60/001 |
| 2022/0135065 A1* | 5/2022 | Okada | B60W 60/001 701/23 |
| 2022/0289179 A1* | 9/2022 | Thomas | B60W 60/0027 |
| 2022/0379889 A1* | 12/2022 | Akella | B60W 30/0956 |
| 2023/0124903 A1* | 4/2023 | Yamaguchi | B60W 30/16 701/70 |
| 2023/0176573 A1* | 6/2023 | Kumavat | G05D 1/0038 701/23 |
| 2023/0182696 A1* | 6/2023 | Yeom | B60Q 9/00 701/23 |
| 2023/0264663 A1* | 8/2023 | Fukui | B60T 7/22 701/70 |
| 2023/0294677 A1* | 9/2023 | Oka | B60W 40/08 701/23 |
| 2023/0311869 A1* | 10/2023 | Kato | B60W 60/001 701/41 |
| 2023/0391360 A1* | 12/2023 | Zhu | B60T 17/22 |
| 2024/0034308 A1* | 2/2024 | Agrawal | B60W 50/14 |
| 2024/0059285 A1* | 2/2024 | Ng | B60W 50/14 |
| 2024/0109521 A1* | 4/2024 | Endo | G06V 20/588 |
| 2024/0190457 A1* | 6/2024 | Craig | B60W 60/001 |
| 2024/0199067 A1* | 6/2024 | Hong | B60W 60/001 |

FOREIGN PATENT DOCUMENTS

| | | | | |
|---|---|---|---|---|
| DE | 102007030803 B4 * | 9/2021 | | B60T 7/22 |
| EP | 4163755 A1 * | 4/2023 | | B60W 30/00 |
| JP | 2005-297621 A | 10/2005 | | |
| JP | 2009-126503 A | 6/2009 | | |
| JP | 2011-121509 A | 6/2011 | | |
| JP | 2018-016248 A | 2/2018 | | |
| JP | 2019-006193 A | 1/2019 | | |
| JP | 2019-142303 A | 8/2019 | | |
| JP | 2019-197467 A | 11/2019 | | |
| JP | 2020-125089 A | 8/2020 | | |
| WO | 2013/018198 A1 | 2/2013 | | |
| WO | WO-2019073525 A1 * | 4/2019 | | B60W 30/09 |
| WO | WO-2019104054 A1 * | 5/2019 | | B60W 30/162 |
| WO | WO-2022251014 A1 * | 12/2022 | | B60W 30/0956 |

\* cited by examiner

BRAKING CONTROL METHOD AND BRAKING CONTROL DEVICE

TECHNICAL FIELD

The present invention relates to a braking control method and a braking control device.

BACKGROUND

A braking control device controls a braking actuator so as to decrease the vehicle speed before the subject vehicle reaches an expected stop position and then stop the subject vehicle at the expected stop position. The braking control device described in JP2005-297621A controls the deceleration of the subject vehicle before it reaches the expected stop position in accordance with conditions such as the vehicle speed of the subject vehicle, the number of passengers, and the weather.

SUMMARY

Unfortunately, however, the braking control device of JP2005-297621A cannot control the vehicle speed with deceleration in accordance with whether or not a moving object is detected downstream the expected stop position.

A problem to be solved by the present invention is to provide a braking control method and a braking control device that, when stopping the subject vehicle at an expected stop position, control the vehicle speed based on deceleration in accordance with whether or not a moving object is detected in a predetermined region downstream the expected stop position.

In braking control for stopping the subject vehicle at an expected stop position, the present invention solves the above problem through determining whether or not a moving object is detected in a predetermined region downstream the expected stop position, and when determining that the moving object is detected in the predetermined region, changing the position, at which the deceleration is decreased in the braking control, upstream relative to that when determining that no moving object is detected in the predetermined region.

According to the present invention, the vehicle speed can be controlled based on the deceleration in accordance with whether or not a moving object is detected in the predetermined region downstream the expected stop position.

DETAILED DESCRIPTION

Hereinafter, one or more embodiments of the present invention will be described with reference to the drawings.

Figure 1:
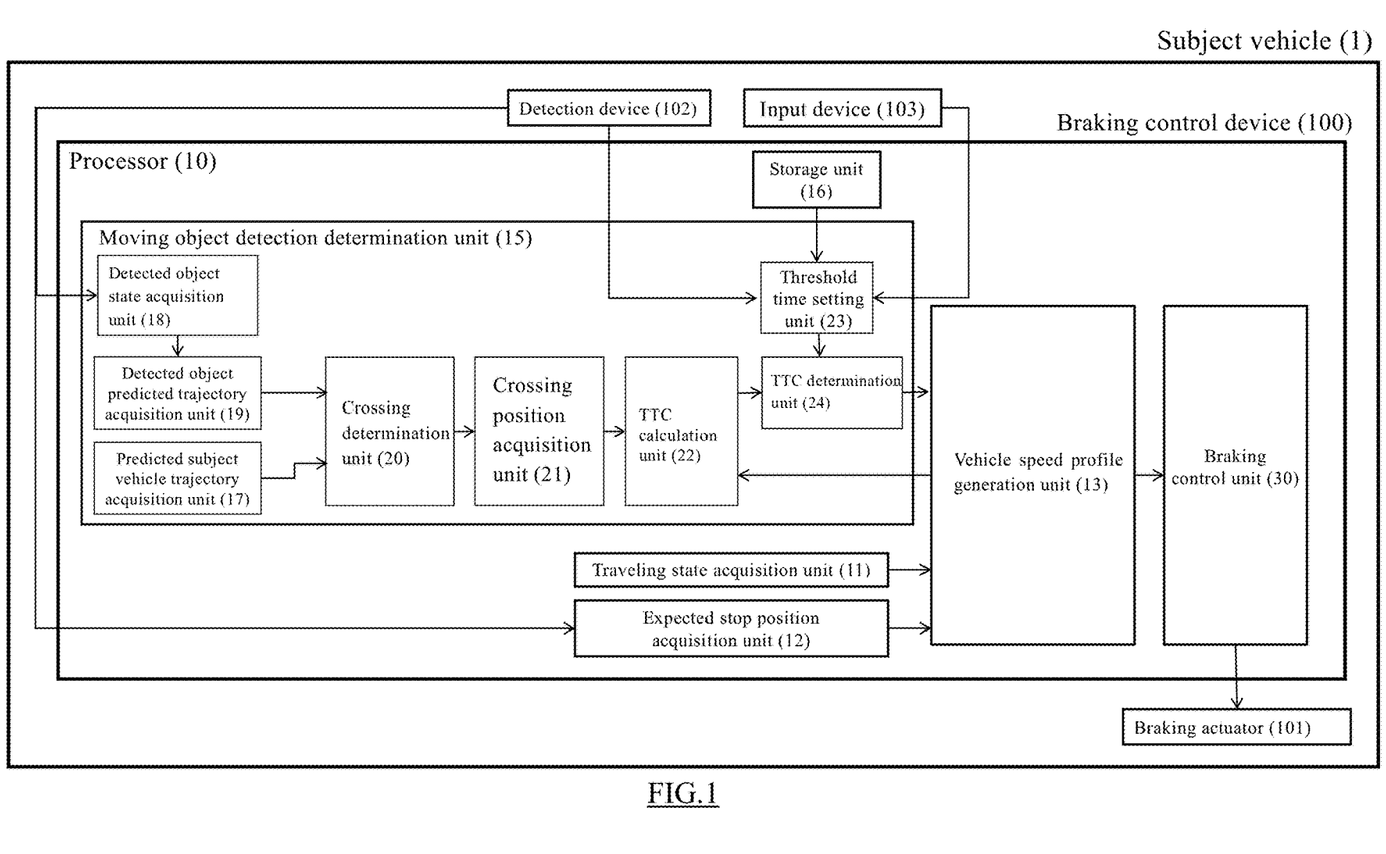
FIG. 1 is a block diagram illustrating the configuration of a braking control device according to an embodiment of the present invention.

As illustrated in FIG. 1, a subject vehicle 1 has a braking control device 100, a braking actuator 101, a detection device 102, and an input device 103. The braking control device 100 autonomously controls the braking actuator 101. The braking control device 100 controls the braking actuator 101 thereby to control the braking operation of the subject vehicle 1. This allows the braking control device 100 to start deceleration of the subject vehicle 1 and control the deceleration of the subject vehicle which is decelerating.

The detection device 102 is, for example, an exterior camera or radar. The detection device 102 can detect the presence of a detected object. The detected object may be a movable object such as a pedestrian, a bicycle, a wheelchair, an animal, or another vehicle. Additionally or alternatively, the detection device 102 can detect a stop line painted on a road surface. Additionally or alternatively, the detection device 102 can detect a traffic signal and its signal color.

The input device 103 is a user interface that allows an occupant of the subject vehicle 1 to input a command. The input device 103 is, for example, a touch panel type display. Additionally or alternatively, the input device 103 may be a microphone. When the input device 103 is a microphone, an occupant of the subject vehicle 1 inputs a command to the input device 103 by voice.

The configuration of the braking control device 100 will then be described in detail with reference to FIGS. 1 to 5.

As illustrated in FIG. 1, the braking control device 100 includes a processor 10 that controls the braking actuator 101 of the subject vehicle 1. The processor 10 is composed of a read only memory (ROM) that stores programs for controlling the driving of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. The processor 10 includes a traveling state acquisition unit 11, an expected stop position acquisition unit 12, a vehicle speed profile generation unit 13, a moving object detection determination unit 15, a storage unit 16, and a braking control unit 30. The traveling state acquisition unit 11, the expected stop position acquisition unit 12, the vehicle speed profile generation unit 13, the moving object detection determination unit 15, the storage unit 16, and the braking control unit 30 execute programs for achieving respective functions of the processor 10.

In FIG. 1, the braking control device 100 is equipped in the subject vehicle 1, but the present invention is not limited to this, and the braking control device 100 may be a device that remotely operates the subject vehicle 1.

The traveling state acquisition unit 11 of the braking control device 100 acquires a vehicle speed Vc of the subject vehicle 1 and a subject vehicle position Pv. The traveling state acquisition unit 11 acquires the vehicle speed Vc of the subject vehicle 1 from a vehicle speed sensor (not illustrated) provided in the subject vehicle 1. Additionally or alternatively, the traveling state acquisition unit 11 detects radio waves transmitted from a plurality of communication satellites using a GPS unit and periodically acquires positional information of the subject vehicle. Additionally or alternatively, the traveling state acquisition unit 11 acquires the current and/or future subject vehicle position Pv based on the positional information of the subject vehicle acquired by the GPS unit, the angle change information acquired from a gyro sensor, and the vehicle speed Vc acquired from the vehicle speed sensor.

Figure 2:
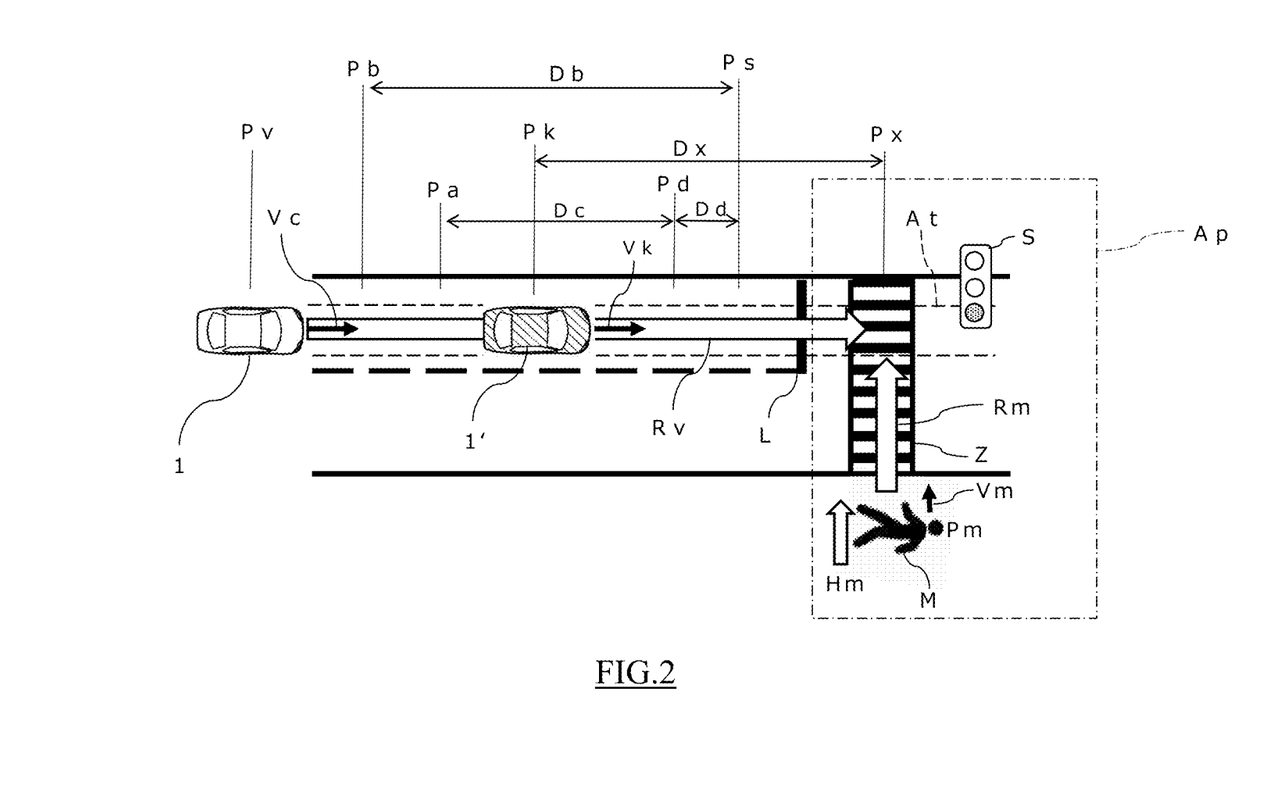
FIG. 2 is a diagram illustrating an example of the positional relationship between a subject vehicle including the braking control device illustrated in FIG. 1 and a detected object.

The expected stop position acquisition unit 12 of the braking control device 100 acquires an expected stop position Ps at which the subject vehicle 1 traveling on a route is expected to stop. For example, as illustrated in FIG. 2, when the signal color of a traffic signal S detected by the detection device 102 is a stop instruction color (e.g., red), the expected stop position acquisition unit 12 acquires, as the expected stop position Ps, a position a predetermined distance before a stop line L detected by the detection device 102 (on the upstream side in the traveling direction). The expected stop position acquisition unit 12 sets the expected stop position Ps so that the front end of the subject vehicle 1 does not exceed the stop line L downstream when the subject vehicle 1 stops. Additionally or alternatively, the expected stop position acquisition unit 12 may acquire the expected stop position Ps based on the map database stored in the storage unit 16.

In FIG. 2, the right side is the downstream side (traveling direction of the subject vehicle 1) while the left side is the upstream side (opposite direction to the traveling direction of the subject vehicle 1).

Figure 3:
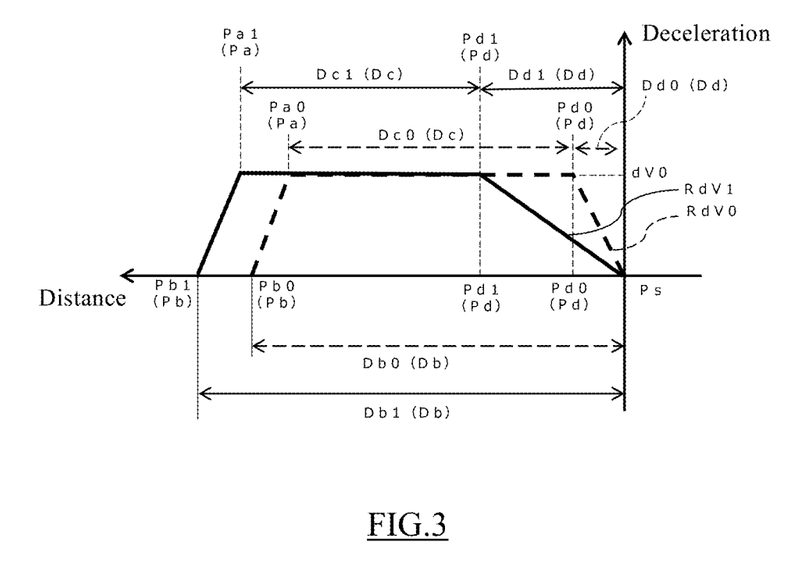
FIG. 3 is a graph illustrating an example of vehicle deceleration controlled by the braking control device illustrated in FIG. 1.

The vehicle speed profile generation unit 13 of the braking control device 100 calculates, based on the vehicle speed Vc of the subject vehicle 1, the subject vehicle position Pv, and the expected stop position Ps, a vehicle speed profile that defines deceleration for positions on the route along which the subject vehicle 1 reaches the expected stop position Ps. The vehicle speed profile is defined by the positions of the subject vehicle 1 traveling on the route to the expected stop position Ps and the deceleration of the vehicle speed of the subject vehicle 1. FIG. 3 illustrates an example of the vehicle speed profile defined by transition of deceleration of the subject vehicle 1 with respect to the distance (positional relationship) between the subject vehicle position Pv and the expected stop position Ps. The vertical axis of FIG. 3 represents the deceleration of the subject vehicle 1. The horizontal axis of FIG. 3 represents the distance from the subject vehicle position Pv to the expected stop position Ps. The dashed line graph illustrates an example of a first vehicle speed profile that is used when a determination is made that no moving object is detected in a predetermined region Ap downstream the expected stop position Ps, that is, when a determination is made that the vehicle speed profile does not need to be changed. The predetermined region Ap illustrated in FIG. 3 is a (downstream) region in the traveling direction of the subject vehicle 1 from the expected stop position Ps, and this region includes a crosswalk Z that crosses the route on which the subject vehicle 1 travels. The predetermined region Ap can be appropriately set in accordance with the speed of the subject vehicle 1, the number of lanes, the traffic volume, etc. The solid line graph illustrates an example of a second vehicle speed profile. The second vehicle speed profile is a vehicle speed profile that is used when a determination is made that a moving object is detected in the predetermined region Ap, that is, when a determination is made that the vehicle speed profile needs to be changed. The first vehicle speed profile is a reference vehicle speed profile, and the second vehicle speed profile is a vehicle speed profile that is different from the first vehicle speed profile and is changed in accordance with the moving object detection result. The procedure of a changing process for the vehicle speed profile will be described later.

The vehicle speed profile is composed of a plurality of data items used by the braking control device 100 to control the vehicle speed of the subject vehicle 1. Specifically, as illustrated in FIG. 2 and the dashed line graph and solid line graph of FIG. 3, the vehicle speed profile has a deceleration start position Pb (Pb0, Pb1) upstream the expected stop position Ps. The deceleration start position Pb is a position at which the subject vehicle 1 starts deceleration. The section between the deceleration start position Pb and the expected stop position Ps is a braking section Db (Db0, Db1) in which the braking control device 100 controls deceleration of the subject vehicle 1. In addition, the vehicle speed profile has a reference deceleration reaching position Pa located upstream the expected stop position Ps and downstream the deceleration start position Pb and a deceleration decrease position Pd located downstream the reference deceleration reaching position Pa and upstream the expected stop position Ps. The section between the reference deceleration reaching position Pa and the deceleration decrease position Pd is a reference deceleration section Dc (Dc0, Dc1) in which a reference deceleration dV0 is maintained. That is, the subject vehicle 1 travels at the reference deceleration dV0 in the reference deceleration section Dc. The section between the deceleration decrease position Pd (Pd0, Pd1) and the expected stop position Ps is a deceleration decrease section Dd (Dd0, Dd1) in which braking control is performed at a lower deceleration than the reference deceleration dV0. That is, the subject vehicle 1 travels at a lower deceleration than the reference deceleration dV0 in the deceleration decrease section Dd. The deceleration decrease position Pd is the start position of the deceleration decrease section Dd. The deceleration of the subject vehicle 1 based on the vehicle speed profile is a predetermined reference deceleration dV0 in the reference deceleration section Dc and is lower than the reference deceleration dV0 in the deceleration decrease section Dd. More specifically, the deceleration of the subject vehicle 1 based on the vehicle speed profile increases between the deceleration start position Pb and the reference deceleration reaching position Pa and reaches the reference deceleration dV0 at the reference deceleration reaching position Pa. Then, the deceleration dV of the subject vehicle 1 maintains a constant reference deceleration dV0 between the reference deceleration reaching position Pa and the deceleration decrease position Pd (reference deceleration section Dc). The deceleration change rate is 0 (zero) in the reference deceleration section Dc. Then, the deceleration dV of the subject vehicle 1 decreases at a constant deceleration change rate between the deceleration decrease position Pd (the start position of the deceleration decrease section Dd) and the expected stop position Ps (in the deceleration decrease section Dd). Then, the deceleration dV of the subject vehicle 1 becomes 0 (zero) at the expected stop position Ps. The deceleration decrease position Pd0 in the first vehicle speed profile illustrated in FIG. 3 (dashed line graph) is different from the deceleration decrease position Pd1 in the second vehicle speed profile (solid line graph). The deceleration decrease position Pd1 is a position on the upstream side of the expected stop position Ps relative to the deceleration decrease position Pd0. That is, the distance from the expected stop position Ps to the deceleration decrease position Pd1 is relatively longer than the distance from the expected stop position Ps to the deceleration decrease position Pd0.

As illustrated in FIG. 1, the vehicle speed profile generation unit 13 outputs a control command including the first or second vehicle speed profile to the braking control unit 30.

The moving object detection determination unit 15 of the braking control device 100 determines whether or not a moving object is detected in the predetermined region Ap based at least on a detected object position Pm of a detected object M. That is, the moving object detection determination unit 15 determines whether or not the detected object M is a moving object. The moving object refers to, among movable objects detected in the predetermined region Ap, an object that moves ahead of the subject vehicle 1 at the timing when the subject vehicle 1 reaches the expected stop position Ps or an object whose probability of existence in front of the subject vehicle 1 is higher than a predetermined probability.

When determining that a moving object is detected in the predetermined region Ap, the moving object detection determination unit 15 determines that the vehicle speed profile generated by the vehicle speed profile generation unit 13 needs to be changed. When determining that a moving object is detected in the predetermined region Ap (when determining that the vehicle speed profile needs to be changed), the moving object detection determination unit 15 outputs a command to change the vehicle speed profile to the vehicle speed profile generation unit 13. The moving object detection determination unit 15 includes a predicted subject vehicle trajectory acquisition unit 17, a detected object state acquisition unit 18, a detected object predicted trajectory acquisition unit 19, a crossing determination unit 20, a crossing position acquisition unit 21, a TTC calculation unit 22, a threshold time setting unit 23, and a TTC determination unit 24. Detailed descriptions of each configuration of the moving object detection determination unit 15 will be provided later.

The storage unit 16 of the braking control device 100 stores past driving histories of the subject vehicle 1. The driving histories stored in the storage unit 16 include a history of the vehicle speed of the subject vehicle 1 when the driver is manually driving the subject vehicle 1. That is, the driving histories stored in the storage unit 16 include history information that indicates how the deceleration dV of the subject vehicle 1 changes before the subject vehicle 1 stops at the expected stop position Ps when the driver is manually driving the subject vehicle 1. The driving histories may be associated with identification information such as face authentication information of the driver. Additionally or alternatively, the storage unit 16 may store map information. The storage unit 16 illustrated in FIG. 1 is provided in the processor 10 of the braking control device 100, but the present invention is not limited to this, and the storage unit 16 may be provided in another device capable of communicating with the processor 10 or in a server.

The braking control unit 30 of the braking control device 100 controls the braking actuator 101 in accordance with the vehicle speed profile generated by the vehicle speed profile generation unit 13. This allows the braking control unit 30 to control the vehicle speed Vc of the subject vehicle 1 so that the subject vehicle 1 decelerates in accordance with the deceleration specified in the vehicle speed profile. The vehicle speed Vc and deceleration dV of the subject vehicle 1 that are actually controlled based on the vehicle speed profile do not necessarily match the vehicle speed Vc and deceleration dV specified in the vehicle speed profile, and may be values affected by the traveling environment of the subject vehicle 1, the situations of road surfaces, etc.

Each configuration of the moving object detection determination unit 15 illustrated in FIG. 1 will then be described in detail.

As illustrated in FIG. 2, the predicted subject vehicle trajectory acquisition unit 17 of the moving object detection determination unit 15 acquires a predicted subject vehicle trajectory Rv that is a route on which the subject vehicle 1 is expected to travel. The predicted subject vehicle trajectory Rv is a trajectory that is set based on the positional information of the destination, the set route information, the lane information, etc.

The detected object state acquisition unit 18 of the moving object detection determination unit 15 acquires the state of the detected object M detected in the predetermined region Ap downstream the expected stop position Ps. That is, the detected object state acquisition unit 18 acquires a detected object position Pm of the detected object M, a moving direction Hm of the detected object M, and a moving speed Vm of the detected object M from the data detected by the detection device 102. The detected object state acquisition unit 18 may perform communication with a detection device such as a camera provided along the travel route to acquire data regarding the state of the detected object M.

The detected object predicted trajectory acquisition unit 19 of the moving object detection determination unit 15 acquires, based on the detected object position Pm, moving direction, and moving speed Vm of the detected object M, a detected object predicted trajectory Rm of the detected object M until the subject vehicle 1 reaches the expected stop position Ps. When the detection device 102 detects the crosswalk Z, the detected object predicted trajectory acquisition unit 19 may acquire the detected object predicted trajectory Rm on the assumption that the pedestrian, who is the detected object M, moves along the crosswalk Z. Additionally or alternatively, when the detection device 102 detects an obstacle in the moving direction of the detected object M, the detected object predicted trajectory acquisition unit 19 may acquire the detected object predicted trajectory Rm on the assumption that the detected object M moves while taking a detour around the obstacle.

The crossing determination unit 20 of the moving object detection determination unit 15 determines whether or not the predicted subject vehicle trajectory Rv and the detected object predicted trajectory Rm cross each other. Specifically, as illustrated in FIG. 2, the detected object predicted trajectory acquisition unit 19 sets a predicted subject vehicle trajectory area At including the predicted subject vehicle trajectory Rv. In the example of FIG. 2, the predicted subject vehicle trajectory area At is a strip-shaped region extending linearly along the lane. The width of the predicted subject vehicle trajectory area At is wider than the vehicle width of the subject vehicle 1 and narrower than the width of the lane in which the subject vehicle 1 travels. The detected object predicted trajectory acquisition unit 19 determines, based on the detected object predicted trajectory Rm, whether or not the detected object M may enter the predicted subject vehicle trajectory area At from when the detected object M is detected until when the subject vehicle 1 reaches the expected stop position Ps. Then, when determining that the detected object M may enter the predicted subject vehicle trajectory area At from when the detected object M is detected until when the subject vehicle 1 reaches the expected stop position Ps, the detected object predicted trajectory acquisition unit 19 determines that the predicted subject vehicle trajectory Rv and the detected object predicted trajectory Rm cross each other. The detected object predicted trajectory acquisition unit 19 may determine whether or not the predicted subject vehicle trajectory Rv and the detected object predicted trajectory Rm cross each other without setting the predicted subject vehicle trajectory area At.

As illustrated in FIG. 2, the crossing position acquisition unit 21 of the moving object detection determination unit 15 acquires a crossing position Px between the predicted subject vehicle trajectory Rv and the detected object predicted trajectory Rm. The crossing position acquisition unit 21 acquires, based on the detected object predicted trajectory Rm, a position at which the detected object M is expected to enter the predicted subject vehicle trajectory area At as the crossing position Px. The crossing position acquisition unit 21 may acquire a point at which the predicted subject vehicle trajectory Rv and the detected object predicted trajectory Rm cross each other as the crossing position Px.

The TTC calculation unit 22 of the moving object detection determination unit 15 calculates, based on the vehicle speed profile generated by the vehicle speed profile generation unit 13, a TTC (Time To Collision) Tk obtained by dividing a virtual crossing distance between each of two or more virtual positions Pk located upstream the expected stop position Ps and the crossing position Px by a virtual vehicle speed Vk corresponding to each virtual position Pk. In other words, as illustrated in FIG. 2, provided that a virtual subject vehicle 1' is traveling at the virtual position Pk at the virtual vehicle speed Vk in accordance with the vehicle speed profile and the virtual subject vehicle 1' travels while maintaining the virtual vehicle speed Vk after passing through a virtual position Pk, the TTC Tk is a time required for the virtual subject vehicle 1' to reach the crossing position Px from the virtual position Pk. That is, the TTC Tk is calculated by the following formula (1).

Mathematical Formula 1

$$Tk=Dx/Vk \quad (1)$$

Figure 4:
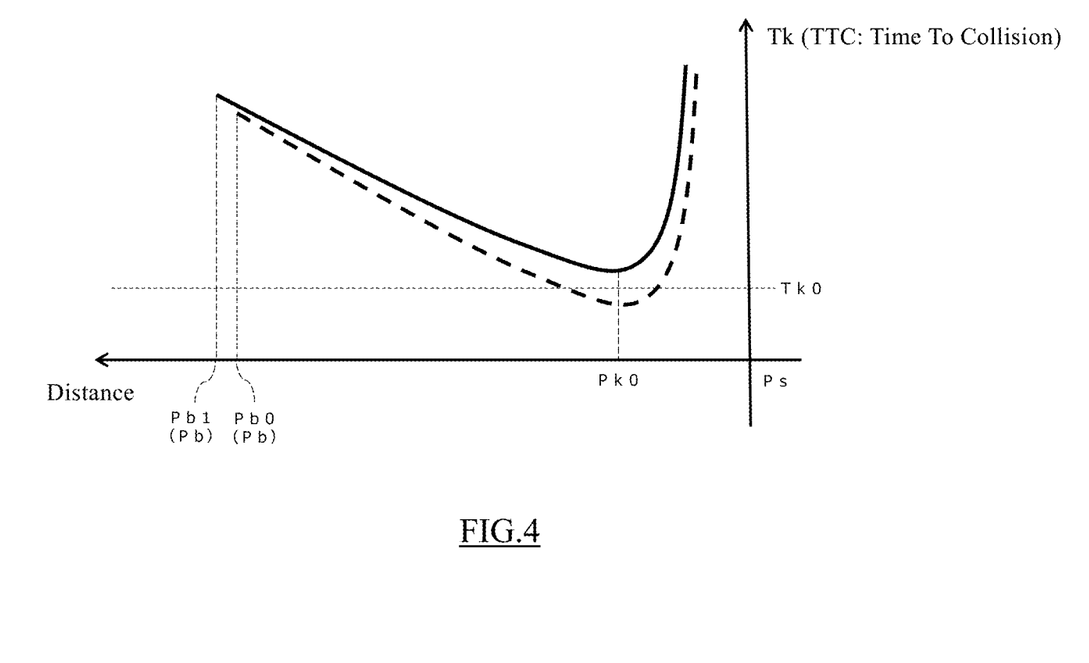
FIG. 4 is a graph illustrating an example of TTC (Time To Collision) calculated by the braking control device illustrated in FIG. 1.

FIG. 4 is a graph illustrating the relationship between the virtual crossing distance Dx and the TTC Tk. The vertical axis in FIG. 4 represents the TTC Tk. That is, FIG. 4 is a graph illustrating the TTC Tk calculated for a plurality of virtual positions Pk that are continuously acquired between the deceleration start position Pb and the expected stop position Ps. The dashed line graph illustrates an example of the TTC Tk when the subject vehicle 1 travels in accordance with the first vehicle speed profile upon a determination that no moving object is detected in the predetermined region Ap downstream the expected stop position Ps (upon a determination that the vehicle speed profile does not need to be changed). The solid line graph illustrates an example of the TTC Tk calculated based on the modified second vehicle speed profile generated by the vehicle speed profile generation unit 13 upon a determination that a moving object is detected in the predetermined region Ap (upon a determination that the vehicle speed profile needs to be changed).

As illustrated in FIG. 4, the threshold time setting unit 23 of the moving object detection determination unit 15 sets a threshold time Tk0 of the TTC Tk for determining whether the vehicle speed profile needs to be changed. When the TTC Tk becomes shorter than the threshold time Tk0, the occupants of the subject vehicle 1 feel uncomfortable that "the speed of approaching the crossing position Px is too high." On the other hand, when the TTC Tk is not shorter than the threshold time Tk0, the occupants of the subject vehicle 1 do not feel uncomfortable. The threshold time setting unit 23 sets the threshold time Tk0 in accordance with a command that is input to the input device 103 provided in the subject vehicle 1. For example, the threshold time setting unit 23 sets the threshold time Tk0 in accordance with a mode that is selected by an occupant via the input device 103. Specifically, when an occupant selects a mode in which the subject vehicle 1 starts deceleration at earlier timing than in the normal mode, the value of the threshold time Tk0 is set higher than in the normal mode. Additionally or alternatively, when an occupant selects a mode in which the subject vehicle 1 is decelerated at a higher deceleration than in the normal mode, the value of the threshold time Tk0 is set higher than in the normal mode.

Additionally or alternatively, the threshold time setting unit 23 may set the threshold time Tk0 based on a driving history stored in the storage unit 16. For example, when determining, based on the past driving history, that the deceleration tends to start at earlier timing than the reference deceleration start timing, the threshold time setting unit 23 sets the value of the threshold time Tk0 to be higher than a reference value that is preliminarily determined. Additionally or alternatively, when determining, based on the past driving history, that the subject vehicle 1 tends to be decelerated at a higher deceleration than a reference deceleration, the threshold time setting unit 23 sets the value of the threshold time Tk0 to be higher than a reference value that is preliminarily determined. Additionally or alternatively, the threshold time setting unit 23 may set the threshold time Tk0 corresponding to an attribute of the detected object M (such as adult or child, human or animal, or pedestrian or bicycle) based on the driving history using a learnt model in which the deceleration pattern is learnt for the attribute of the detected object M.

Additionally or alternatively, the threshold time setting unit 23 may set the threshold time Tk0 in accordance with at least one of the size, shape, and behavior of the detected object M. For example, when the height of a pedestrian who is the detected object M detected by the detection device 102 is equal to or less than a predetermined value, the threshold time setting unit 23 determines that the detected object M is a child, and sets the value of the threshold time Tk0 to be higher than when the detected object M is an adult pedestrian. Additionally or alternatively, when determining that the pedestrian who is the detected object M detected by the detection device 102 behaves with a larger motion as compared to a normal adult pedestrian, the threshold time setting unit 23 determines that the detected object M is a child, and sets the value of the threshold time Tk0 to be higher than when the detected object M is an adult pedestrian. Additionally or alternatively, the threshold time setting unit 23 may determine an attribute of the detected object M (such as adult or child, human or animal, or pedestrian or bicycle) in accordance with the shape of the detected object M to set the threshold time Tk0.

The threshold time Tk0 may be an experimentally obtained value.

Then, the TTC determination unit 24 of the moving object detection determination unit 15 illustrated in FIG. 1 determines whether or not the TTC Tk calculated by the TTC calculation unit 22 becomes shorter than the threshold time Tk0 set by the threshold time setting unit 23. When determining that the TTC Tk becomes shorter than the threshold time Tk0, the TTC determination unit 24 determines that a moving object is detected in the predetermined region Ap, and determines that the vehicle speed profile needs to be changed. For example, in the dashed line graph of FIG. 4, there is a section in which the TTC Tk is shorter than the threshold time Tk0, so the TTC determination unit 24 determines that a moving object is detected in the predetermined region Ap, and determines that the vehicle speed profile needs to be changed. On the other hand, in the solid line graph of FIG. 4, all the TTCs Tk are equal to or larger than the threshold time Tk0, so the TTC determination unit 24 determines that no moving object is detected in the predetermined region Ap, and determines that the vehicle speed profile does not need to be changed. The TTC determination unit 24 of the moving object detection determination unit 15 may calculate the TTC Tk only for a virtual position Pk0 corresponding to the virtual crossing distance Dx at which the TTC Tk takes the minimum value and determine whether or not the TTC Tk at the virtual position Pk0 is shorter than the threshold time Tk0.

When determining that a moving object is detected in the predetermined region Ap, the TTC determination unit 24 outputs a command to change the vehicle speed profile to the vehicle speed profile generation unit 13. In response to the command from the TTC determination unit 24, the vehicle speed profile generation unit 13 changes the vehicle speed profile so that all the TTCs Tk are equal to or larger than the threshold time Tk0. Specifically, as illustrated in FIG. 3, the vehicle speed profile generation unit 13 changes the deceleration start position Pb to the deceleration start position Pb1 on the upstream side of the deceleration start position Pb0 before the change. Additionally or alternatively, the vehicle speed profile generation unit 13 changes the deceleration decrease position Pd to the deceleration decrease position Pd1 on the upstream side of the deceleration decrease position Pd0 before the change. That is, the phrase "the vehicle speed profile generation unit 13 changes the vehicle speed profile" means that the vehicle speed profile generation unit 13 sets the vehicle speed profile used for the braking control to the vehicle speed profile illustrated as the solid line graph in FIG. 3 as substitute for the vehicle speed profile illustrated as the dashed line graph in FIG. 3. Through this operation, the graph of TTC Tk versus virtual crossing distance Dx in FIG. 4 is changed from the dashed line graph to the solid line graph, and all the TTCs Tk are longer than threshold time Tk0.

The deceleration start position Pb0 before the change and the deceleration decrease position Pd0 before the change are those when a determination is made that no moving object is detected in the predetermined region Ap, that is, when a determination is made that the vehicle speed profile does not need to be changed.

The vehicle speed profile generation unit 13 shifts (changes) the deceleration decrease position Pd upstream, as illustrated in FIG. 3, thereby to obtain a changed vehicle speed profile having a deceleration decrease section Dd1. A deceleration change rate RdV1 that is a rate of change in deceleration in the deceleration decrease section Dd1 is smaller than a deceleration change rate RdV0 in a deceleration decrease section Dd0 when a determination is made that no moving object is detected in the predetermined region Ap. The deceleration change rate RdV1 to be a reference is a predetermined specified change rate. Specifically, the deceleration change rate RdV1 (specified change rate) when the vehicle speed profile is changed is a specified value that is preliminarily set so as to obtain a deceleration change rate that can give the occupants the feeling that "sufficient deceleration is being executed for the subject vehicle 1 to stop." That is, when the moving object detection determination unit 15 determines that a moving object is detected in the predetermined region Ap, the vehicle speed profile generation unit 13 changes the deceleration start position Pb1 and the deceleration decrease position Pd1 so that the deceleration change rate in the deceleration decrease section Dd becomes the deceleration change rate RdV1 which is a predetermined specified change rate.

The procedure of the braking control method executed by the processor 10 of the braking control device 100 will now be described with reference to the flowchart illustrated in FIG. 5.

In step S1, the traveling state acquisition unit 11 acquires the vehicle speed V of the subject vehicle 1 and the subject vehicle position Pv. Then, in step S2, the expected stop position acquisition unit 12 acquires the expected stop position Ps.

Then, in step S3, the vehicle speed profile generation unit 13 generates the vehicle speed profile based on the vehicle speed V of the subject vehicle 1 and the subject vehicle position Pv, which are acquired by the traveling state acquisition unit 11, and the expected stop position Ps acquired by the expected stop position acquisition unit 12.

Then, in step S4, the moving object detection determination unit 15 acquires the position of the detected object M detected by the detection device 102 and determines whether or not the detected object M is present downstream the expected stop position Ps. When a determination is made that the detected object M is not present downstream the expected stop position Ps, the process is concluded.

On the other hand, when a determination is made in step S4 that the detected object M is present downstream the expected stop position Ps, this step is followed by step S5 in which the predicted subject vehicle trajectory acquisition unit 17 of the moving object detection determination unit 15 acquires the predicted subject vehicle trajectory Rv.

Then, in step S6, the detected object state acquisition unit 18 of the moving object detection determination unit 15 acquires the detected object position Pm, moving direction Hm, and moving speed Vm of the detected object M. Then, in step S7, the detected object predicted trajectory acquisition unit 19 of the moving object detection determination unit 15 acquires the detected object predicted trajectory based on the detected object position Pm, moving direction Hm, and moving speed Vm of the detected object M which are acquired by the detected object state acquisition unit 18.

Then, in step S8, the crossing determination unit 20 of the moving object detection determination unit 15 determines whether or not the predicted subject vehicle trajectory Rv and the detected object predicted trajectory Rm cross each other. When a determination is made that the predicted subject vehicle trajectory Rv and the detected object predicted trajectory Rm do not cross each other, the process is concluded.

On the other hand, when the crossing determination unit 20 determines in step S8 that the predicted subject vehicle trajectory Rv and the detected object predicted trajectory Rm cross each other, this step is followed by step S9 in which the crossing position acquisition unit 21 of the moving object detection determination unit 15 acquires the crossing position Px.

Then, in step S10, the TTC calculation unit 22 of the moving object detection determination unit 15 calculates the TTC Tk for each of one or more virtual positions Pk based on the vehicle speed profile generated by the vehicle speed profile generation unit 13.

Then, in step S11, the TTC determination unit 24 of the moving object detection determination unit 15 determines whether or not the TTC Tk calculated by the TTC calculation unit 22 becomes shorter than the threshold time Tk0. When the TTC determination unit 24 determines that the TTC Tk does not become shorter than the threshold time Tk0, the process is concluded.

On the other hand, when a determination is made in step S11 that the TTC Tk becomes shorter than the threshold time Tk0, this step is followed by step S12 in which the TTC determination unit 24 determines that a moving object is detected in the predetermined region Ap (the vehicle speed profile needs to be changed).

Then, in step S13, the vehicle speed profile generation unit 13 changes the vehicle speed profile. After that, the process is concluded.

After step S13, the process may return to step S10. That is, in step S13, the TTC calculation unit 22 may calculate the TTC Tk based on the changed vehicle speed profile. Then, the TTC determination unit 24 may determine again whether or not the TTC Tk calculated by the TTC calculation unit 22 becomes shorter than the threshold time Tk0.

Figure 5:
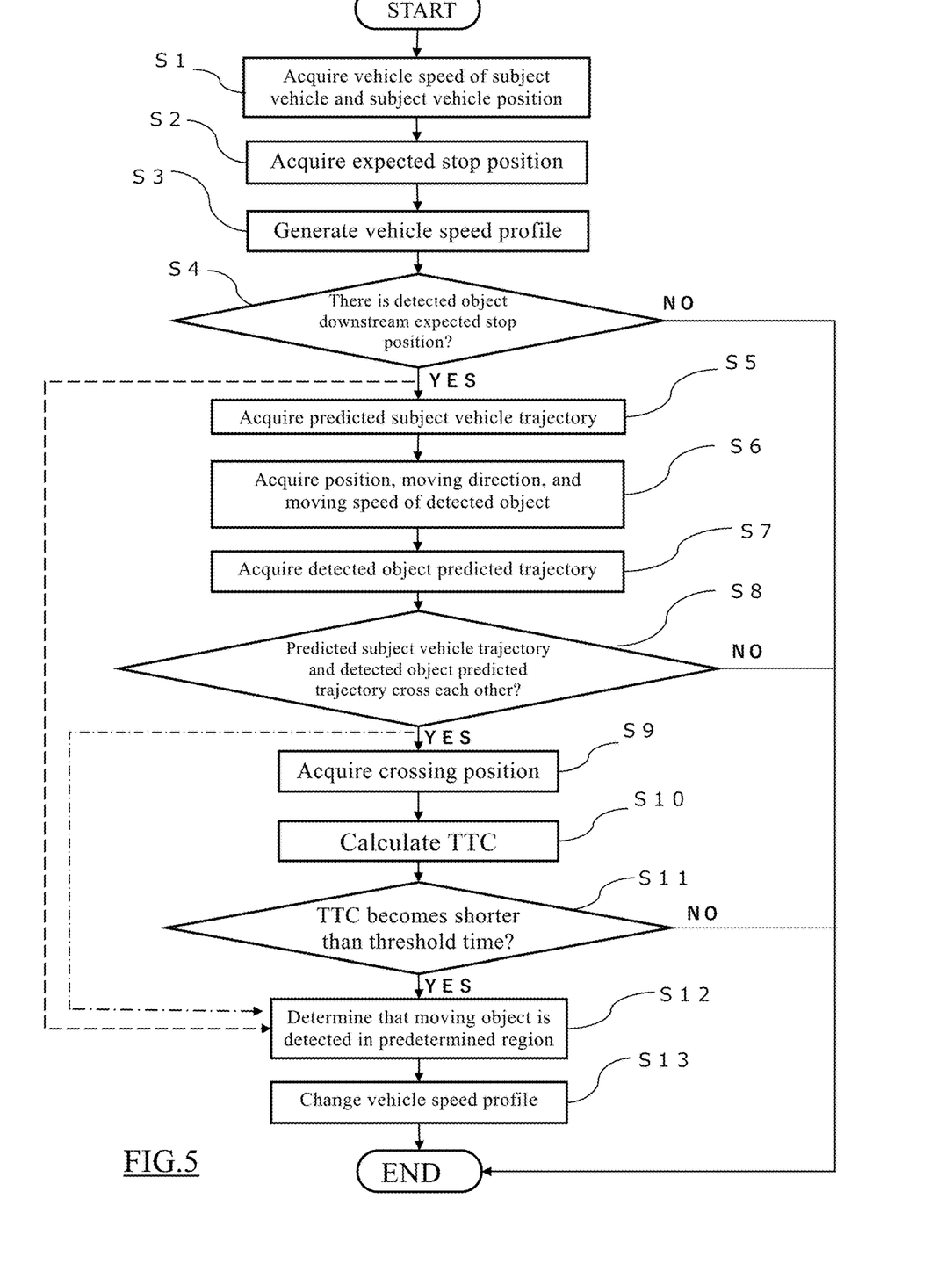
FIG. 5 is a flow chart illustrating the procedure of a braking control method executed by the braking control device illustrated in FIG. 1.

As illustrated with the dashed line in FIG. 5, when a determination is made in step S4 that the detected object M is detected downstream the expected stop position Ps, steps S5 to S11 may be omitted, and the moving object detection determination unit 15 may determine in step S12 that a moving object is detected in the predetermined region Ap (the vehicle speed profile needs to be changed).

As illustrated with the dashed line in FIG. 5, when a determination is made in step S8 that the predicted subject vehicle trajectory Rv and the detected object predicted trajectory Rm cross each other, steps S9 to S11 may be omitted, and the moving object detection determination unit 15 may determine in step S12 that a moving object is detected in the predetermined region Ap (the vehicle speed profile needs to be changed).

As described above, the braking control device 100 according to the present embodiment determines whether or not a moving object is detected in the predetermined region Ap downstream the expected stop position Ps, and when determining that a moving object is detected in the predetermined region Ap, changes the start position of the deceleration decrease section Dd (deceleration decrease position Pd) in the vehicle speed profile from the deceleration decrease position Pd0, which is currently set or applied, to the deceleration decrease position Pd1 located relatively upstream. That is, when determining that a moving object is detected in the predetermined region Ap, the braking control device 100 changes the start position (deceleration decrease position Pd) of the deceleration decrease section Dd upstream relative to that when determining that no moving object is detected in the predetermined region Ap. The start position of the deceleration decrease section Dd, that is, the deceleration decrease position Pd, represents the timing at which the deceleration is moderated, and the occupants perceive the timing from the behavior of the vehicle. As the deceleration is moderated, the occupants feel that sufficient deceleration is performed to stop at the expected stop position Ps and expect that the vehicle "will stop soon." That is, the braking control device 100 brakes the vehicle in accordance with the second vehicle speed profile in which the deceleration decrease position Pd is changed upstream, and can thereby to advance the timing at which the deceleration is decreased from the reference deceleration dV0, that is, the timing at which the occupants feel that the vehicle is "about to stop soon" as compared to the braking control in which the first speed profile before the change is applied. The braking control device 100 can therefore execute the vehicle speed control at a deceleration that matches the feeling of occupants who are aware of the presence of the moving object, in accordance with whether or not a moving object is detected in the predetermined region Ap downstream the expected stop position. That is, as compared to the braking control that uniformly transitions the deceleration regardless of the presence or absence of a moving object located downstream the expected stop position Ps, the braking control device 100 of the present embodiment can reduce the uncomfortable feeling given to the occupants when a moving object is present downstream the expected stop position Ps.

When a detected object is detected in the predetermined region Ap, the processor 10 of the braking control device 100 determines that a moving object is detected in the predetermined region Ap, and changes the vehicle speed profile. The aspect of "determining that a moving object is detected in the predetermined region Ap when a detected object is detected in the predetermined region Ap" includes determining that a moving object is detected in the predetermined region Ap when a detected object detected in the predetermined region Ap satisfies a predetermined condition. This allows the braking control device 100 to generate the vehicle speed profile in accordance with the presence of the detected object in the predetermined region Ap.

Additionally or alternatively, when a determination is made that the predicted subject vehicle trajectory Rv and the detected object predicted trajectory Rm cross each other, the braking control device 100 acquires the crossing position Px between the predicted subject vehicle trajectory Rv and the detected object predicted trajectory Rm (see FIG. 2). Then, the braking control device 100 calculates, based on the vehicle speed profile, the TTC Tk obtained by dividing the distance Dx between each of one or more virtual positions Pk located upstream the expected stop position Ps and the crossing position Px by the virtual vehicle speed Vk corresponding to each virtual position Pk. Furthermore, the braking control device 100 determines whether or not at least one TTC Tk becomes smaller than the predetermined threshold time Tk0, and when determining that the TTC Tk becomes smaller than the threshold time Tk0, determines that a moving object is detected in the predetermined region Ap, and changes the vehicle speed profile. This allows the braking control device 100 to reduce the scenes in which the occupants of the subject vehicle 1 feel that "the speed of the subject vehicle 1 approaching a moving object is too high." The braking control device 100 can therefore execute the vehicle speed control at a deceleration that matches the feeling of the occupants in accordance with the state of the detected object M located downstream the expected stop position Ps before stopping the subject vehicle 1 at the expected stop position Ps.

Additionally or alternatively, the braking control device 100 sets the predicted subject vehicle trajectory area At including the predicted subject vehicle trajectory Rv of the subject vehicle 1. Then, the braking control device 100 determines, based on the detected object predicted trajectory Rm, whether or not the detected object M may enter the predicted subject vehicle trajectory area At from when the detected object M is detected until when the subject vehicle 1 reaches the expected stop position Ps. Furthermore, when predicting that the detected object M may enter the predicted subject vehicle trajectory area At, the braking control device 100 determines that the predicted subject vehicle trajectory Rv and the detected object predicted trajectory Rm cross each other. This allows the braking control device 100 to determine whether or not there is a possibility that the predicted subject vehicle trajectory Rv and the detected object predicted trajectory Rm will cross each other even when the predicted subject vehicle trajectory Rv and the detected object predicted trajectory Rm do not accurately cross or overlap each other.

Additionally or alternatively, the braking control device 100 can set the threshold time Tk0 based on a command that is input to the input device 103 provided in the subject vehicle 1. This allows the braking control device 100 to execute the vehicle speed control at a deceleration that suits the preference of the occupants of the subject vehicle 1 before stopping the subject vehicle 1 at the expected stop position Ps.

Additionally or alternatively, the braking control device 100 can set the threshold time Tk0 based on the driving history stored in the storage unit 16. This allows the braking control device 100 to execute the vehicle speed control in an automated manner at a deceleration that matches the past driving tendency of the subject vehicle 1 before stopping the subject vehicle 1 at the expected stop position Ps.

Additionally or alternatively, the braking control device 100 can set the threshold time Tk0 based on at least one of the size, shape, and behavior of the detected object M. Through this operation, the braking control device 100 can determine an attribute of the detected object M (e.g., whether the detected object M is an adult pedestrian or a child pedestrian) based on at least one of the size of the detected object M (height and/or lateral width) and the shape and behavior pattern of the detected object M and can execute the vehicle speed control in accordance with the attribute of the detected object M. The braking control device 100 can therefore execute the vehicle speed control at a deceleration that matches the feeling of the occupants in accordance with the attribute of the detected object M located downstream the expected stop position Ps before stopping the subject vehicle 1 at the expected stop position Ps.

Additionally or alternatively, when determining that a moving object is detected in the predetermined region Ap, the braking control device 100 changes the deceleration start position Pb farther upstream than otherwise. That is, as illustrated in FIG. 3, the braking control device 100 changes the deceleration start position Pb0 before the change of the vehicle speed profile to the deceleration start position Pb1 on the upstream side. This allows the braking control device 100, when determining that a moving object is detected in the predetermined region Ap, to change the vehicle speed profile so that the subject vehicle 1 starts deceleration at earlier timing. The braking control device 100 can therefore execute the vehicle speed control at a deceleration that matches the feeling of the occupants who observe the presence and behavior of pedestrians present near the expected stop position Ps before stopping the subject vehicle 1 at the expected stop position Ps.

Additionally or alternatively, when determining that a moving object is detected in the predetermined region Ap, the braking control device 100 changes the vehicle speed profile so that the deceleration change rate RdV1 in the deceleration decrease section Dd1 is smaller than the deceleration change rate RdV0 in the deceleration decrease section Dd0 when determining that no moving object is detected in the predetermined region Ap. Through this operation, when determining that a moving object is detected in the predetermined region Ap, the braking control device 100 can make the change in deceleration more moderate than when determining that no moving object is detected in the predetermined region Ap, and traveling of gradually approaching a pedestrian at a relatively low deceleration can be achieved; therefore, the occupants can be given a feeling that "sufficient deceleration is being executed for the subject vehicle 1 to stop." This allows the braking control device 100 to execute the vehicle speed control that matches the feeling of the passengers who recognize the presence of a moving object before stopping the subject vehicle 1 at the expected stop position Ps.

Additionally or alternatively, when determining that a moving object is detected in the predetermined region Ap, the braking control device 100 changes the vehicle speed profile so that the deceleration change rate in the deceleration decrease section Dd becomes the deceleration change rate RdV1 which is a predetermined specified change rate. This allows the braking control device 100 to more efficiently change the deceleration start position Pb1, deceleration decrease position Pd1, and reference deceleration dV0 in the vehicle speed profile to match the specified change rate which is preliminarily determined.

The vehicle speed profile changed by the braking control device 100 is not limited to the example illustrated in FIG. 3.

Figure 6:
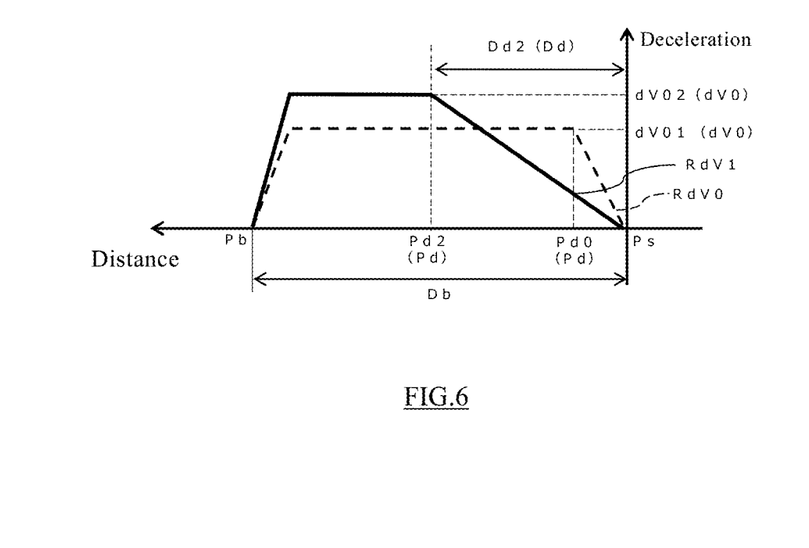
FIG. 6 is a graph illustrating another example of vehicle deceleration controlled by the braking control device illustrated in FIG. 1.
Figure 7:
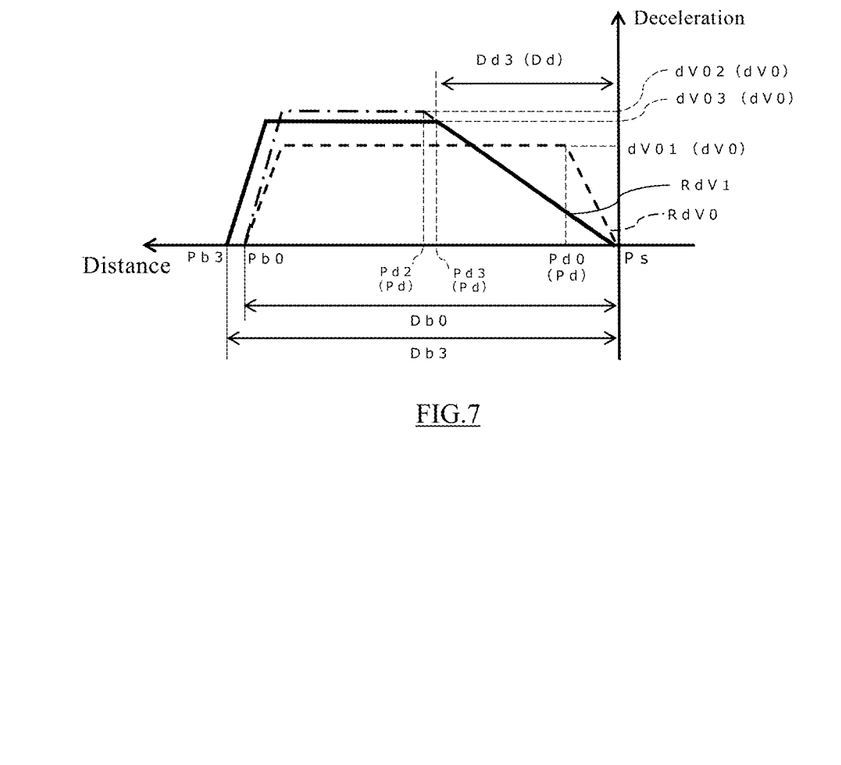
FIG. 7 is a graph illustrating still another example of vehicle deceleration controlled by the braking control device illustrated in FIG. 1.
Figure 8:
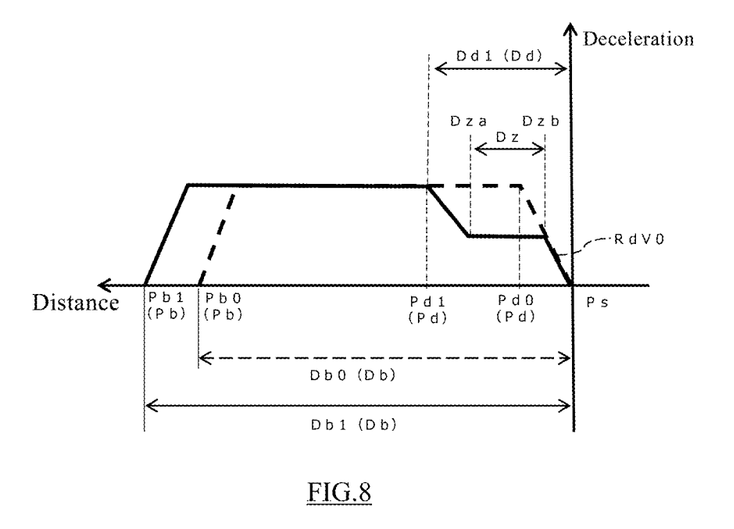
FIG. 8 is a graph illustrating yet another example of vehicle deceleration controlled by the braking control device illustrated in FIG. 1.

For example, as illustrated with the solid line graphs in FIGS. 6 to 8, the vehicle speed profile generation unit 13 of the braking control device 100 may generate modified versions of the second vehicle speed profile. In the following description, the dashed line graphs illustrated in FIGS. 6 to 8 each represent the first vehicle speed profile when no moving object is detected in the predetermined region Ap as in the dashed line graph illustrated in FIG. 3.

In the example illustrated in FIG. 6, when the moving object detection determination unit 15 determines that a moving object is detected in the predetermined region Ap, the vehicle speed profile generation unit 13 changes the deceleration decrease position Pd and the reference deceleration dV0. The deceleration start position Pb is not changed. Specifically, the vehicle speed profile generation unit 13 changes the reference deceleration dV0 to a reference deceleration dV02 that is higher than a reference deceleration dV01 when a determination is made that no moving object is detected in the predetermined region Ap. Regarding the deceleration decrease position Pd, the vehicle speed profile generation unit 13 changes the deceleration decrease position Pd0 when determining that no moving object is detected in the predetermined region Ap to a relatively upstream deceleration decrease position Pd2. In a deceleration decrease section Dd2 between the deceleration decrease position Pd2 and the expected stop position Ps, the deceleration change rate is a specified change rate RdV1, which is smaller than the deceleration change rate RdV0 in the first vehicle speed profile.

As illustrated in FIG. 6, when determining that a moving object is detected in the predetermined region Ap, the braking control device 100 does not change the deceleration start position Pb, and changes the reference deceleration dV0 to be higher than when determining that no moving object is detected in the predetermined region Ap. This allows the braking control device 100 to change, without changing the start timing of deceleration of the subject vehicle 1, the deceleration decrease position Pd to the deceleration decrease position Pd2 located upstream the deceleration decrease position Pd0 when determining that no moving object is detected in the predetermined region Ap. The braking control device 100 can therefore execute the vehicle speed control at a deceleration that matches the feeling of the passengers, who recognize the presence of a moving object, while minimizing the influence of the subject vehicle 1 on the following vehicles, and can decelerate the subject vehicle 1 on the upstream side of the expected stop position Ps.

In the example illustrated in FIG. 7, when the moving object detection determination unit 15 determines that a moving object is detected in the predetermined region Ap, the vehicle speed profile generation unit 13 first assumes that the deceleration start position Pb0 is not changed, and calculates a predicted reference deceleration RV02 that should be set for the deceleration change rate to be the deceleration change rate RdV1. Then, the vehicle speed profile generation unit 13 determines whether or not the predicted reference deceleration RV02 is higher than a predetermined threshold deceleration dV03. When determining that the predicted reference deceleration RV02 is higher than the predetermined threshold deceleration dV03, the vehicle speed profile generation unit 13 sets the reference deceleration dV0 to the threshold deceleration dV3. In addition, the vehicle speed profile generation unit 13 changes the deceleration start position Pb to a deceleration start position Pb3 upstream the deceleration start position Pb0 before the change so that the deceleration change rate in a deceleration decrease section Dd3 becomes the specified change rate RdV1. The threshold deceleration dV03 is the upper limit of deceleration to such an extent that the vehicle speed change of the subject vehicle 1 does not excessively affect the following vehicles, that is, to such an extent that the following vehicles do not observe sudden deceleration. The threshold deceleration dV03 is preliminarily set experimentally.

By changing the vehicle speed profile as illustrated in the solid line graph in FIG. 7, the braking control device 100 can set the reference deceleration dV0 to a predetermined threshold deceleration dV03 or less and change the deceleration decrease position Pd to a deceleration decrease position Pd3 on the upstream side of the deceleration decrease position Pd0 without unduly advancing the timing of starting deceleration of the subject vehicle. Moreover, the braking control device 100 can maintain the deceleration change rate at the deceleration change rate RdV1 in the deceleration decrease section Dd3 between the deceleration decrease position Pd3 and the expected stop position Ps. This allows the braking control device 100 to execute the vehicle speed control at a deceleration that matches the feeling of the passengers while minimizing the influence of the subject vehicle 1 on the following vehicles, and can decelerate the subject vehicle 1 on the upstream side of the expected stop position Ps.

In the example illustrated in FIG. 8, when the moving object detection determination unit 15 determines that a moving object is detected in the predetermined region Ap, the vehicle speed profile generation unit 13 changes the deceleration so that the deceleration decrease section Dd1 includes a constant deceleration section Dz in which the deceleration change rate is 0 (zero). That is, the vehicle speed profile generation unit 13 decreases the deceleration step by step in the deceleration decrease section Dd1. This allows the braking control device 100 to execute the vehicle speed control at a deceleration that matches the feeling of the passengers while reducing the calculation load of the processor 10, and can decelerate the subject vehicle 1 on the upstream side of the expected stop position Ps.

When the subject vehicle 1 is traveling in the braking section Db in accordance with the vehicle speed profile in a state in which no detected object M is detected, if a detected object M is suddenly detected downstream the expected stop position Ps and a determination is made that the detected object M is a moving object, that is, if a moving object is detected in the predetermined region Ap, the braking control device 100 may change the vehicle speed profile at that time point. In this case, the braking control device 100 decelerates the subject vehicle 1 in accordance with the changed vehicle speed profile from the timing when the detection device 102 detects the detected object M until the subject vehicle 1 reaches the expected stop position Ps.

DESCRIPTION OF REFERENCE NUMERALS

100 Braking control device
1 1 Subject vehicle
10 Processor
11 Traveling state acquisition unit
12 Expected stop position acquisition unit
13 Vehicle speed profile generation unit
15 Moving object detection determination unit
16 Storage unit
101 Braking actuator
103 Input device
M Detected object (moving object)
Ps Expected stop position
Pb Deceleration start position
Pd Deceleration decrease position
Px Crossing position
Db Braking section
Dc Reference deceleration section
Dd Deceleration decrease section
Rv Predicted subject vehicle trajectory
Rm Detected object predicted trajectory
At Predicted subject vehicle trajectory area
Tk TTC (Time To Collision)
Tk0 Threshold time
dV0 Reference deceleration

The invention claimed is:

1. A braking control method using a processor to control a braking actuator of a subject vehicle with a vehicle speed profile based on a vehicle speed of the subject vehicle, a subject vehicle position, and an expected stop position at which the subject vehicle is expected to stop, the processor being configured to:
　generate the vehicle speed profile having a reference deceleration section and a deceleration decrease section, the subject vehicle traveling in the reference deceleration section at a predetermined reference deceleration upstream the expected stop position and traveling in the deceleration decrease section at a lower deceleration than the predetermined reference deceleration downstream the reference deceleration section and upstream the expected stop position;
　determine whether or not a moving object is detected in a predetermined region downstream the expected stop position; and
　when determining that the moving object is detected in the predetermined region, change a start position of the deceleration decrease section with respect to the expected stop position upstream relative to that when determining that no moving object is detected in the predetermined region.

2. The braking control method according to claim 1, wherein the processor is configured to, when a detected object is detected in the predetermined region, determine that the moving object is detected in the predetermined region and change the vehicle speed profile.

3. The braking control method according to claim 2, wherein the processor is configured to:
    acquire a predicted subject vehicle trajectory of the subject vehicle;
    acquire a position, moving direction, and moving speed of the detected object;
    acquire a detected object predicted trajectory of the detected object based on the position, moving direction, and moving speed of the detected object;
    determine whether or not the predicted subject vehicle trajectory and the detected object predicted trajectory cross each other; and
    when determining that the predicted subject vehicle trajectory and the detected object predicted trajectory cross each other,
        acquire a crossing position between the predicted subject vehicle trajectory and the detected object predicted trajectory;
        calculate, based on the vehicle speed profile, a time to collision obtained by dividing a distance between at least one virtual position located upstream the expected stop position and the crossing position by a virtual vehicle speed corresponding to the virtual position;
        determine whether or not the time to collision becomes shorter than a predetermined threshold time; and
        when determining that the time to collision becomes shorter than the predetermined threshold time, determine that the moving object is detected.

4. The braking control method according to claim 3, wherein the processor is configured to:
    set a predicted subject vehicle trajectory area including the predicted subject vehicle trajectory of the subject vehicle;
    determine, based on the detected object predicted trajectory, whether or not the detected object may enter the predicted subject vehicle trajectory area from when the detected object is detected until when the subject vehicle reaches the expected stop position; and
    when predicting that the detected object may enter the predicted subject vehicle trajectory area, determine that the predicted subject vehicle trajectory and the detected object predicted trajectory cross each other.

5. The braking control method according to claim 3, wherein the processor is configured to set the predetermined threshold time based on a command input to an input device provided in the subject vehicle.

6. The braking control method according to claim 3, wherein the processor is configured to set the predetermined threshold time based on a driving history stored in a storage unit.

7. The braking control method according to claim 3, wherein the processor is configured to set the predetermined threshold time based on at least one of a size, shape, and behavior of the detected object.

8. The braking control method according to claim 1, wherein
    the vehicle speed profile has a deceleration start position at which the subject vehicle starts deceleration, and
    the processor is configured to, when determining that the moving object is detected in the predetermined region, change the deceleration start position upstream relative to that when determining that no moving object is detected in the predetermined region.

9. The braking control method according to claim 1, wherein
    the vehicle speed profile has a deceleration start position at which the subject vehicle starts deceleration, and
    the processor is configured to, when determining that the moving object is detected in the predetermined region, change the predetermined reference deceleration to be higher than when determining that no moving object is detected in the predetermined region, rather than changing the deceleration start position.

10. The braking control method according to claim 1, wherein the processor is configured to, when determining that the moving object is detected in the predetermined region, change the vehicle speed profile so that a deceleration change rate that is a rate of change in deceleration in the deceleration decrease section is smaller than that when determining that no moving object is detected in the predetermined region.

11. The braking control method according to claim 10, wherein the processor is configured to, when determining that the moving object is detected in the predetermined region, change the vehicle speed profile so that the deceleration change rate in the deceleration decrease section becomes a predetermined specified change rate.

12. The braking control method according to claim 11, wherein the vehicle speed profile has a deceleration start position at which the subject vehicle starts deceleration, and the processor is configured to:
    when determining that no moving object is detected in the predetermined region,
        provided that the deceleration start position is not changed, calculate a predicted reference deceleration that is the predetermined reference deceleration which should be set for the deceleration change rate in the deceleration decrease section to be the predetermined specified change rate;
    determine whether or not the predicted reference deceleration is higher than a predetermined threshold deceleration; and
    when determining that the predicted reference deceleration is higher than the predetermined threshold deceleration, set the predetermined reference deceleration to the predetermined threshold deceleration and change the deceleration start position so that the deceleration change rate becomes the predetermined specified change rate.

13. The braking control method according to claim 1, wherein the processor is configured to, when determining that the moving object is detected in the predetermined region, change the deceleration so that there is a section in which a deceleration change rate that is a rate of change in deceleration in the deceleration decrease section is 0.

14. A braking control device using a processor to control a braking actuator of a subject vehicle with a vehicle speed profile based on a vehicle speed of the subject vehicle, a subject vehicle position, and an expected stop position at which the subject vehicle is expected to stop, the processor comprising:
    a vehicle speed profile generation unit configured to generate the vehicle speed profile having a reference deceleration section and a deceleration decrease section, the subject vehicle traveling in the reference deceleration section at a predetermined reference deceleration upstream the expected stop position and traveling in the deceleration decrease section at a lower deceleration than the predetermined reference deceleration downstream the reference deceleration section and upstream the expected stop position; and a moving object detection determination unit configured to determine whether or not a moving object is detected in a predetermined region downstream the expected stop position, wherein when the moving object detection determination unit determines that the moving object is detected in the predetermined region, the vehicle speed profile generation unit changes a start position of the deceleration decrease section with respect to the expected stop position upstream relative to that when determining that no moving object is detected in the predetermined region.

* * * * *